Figure 1:
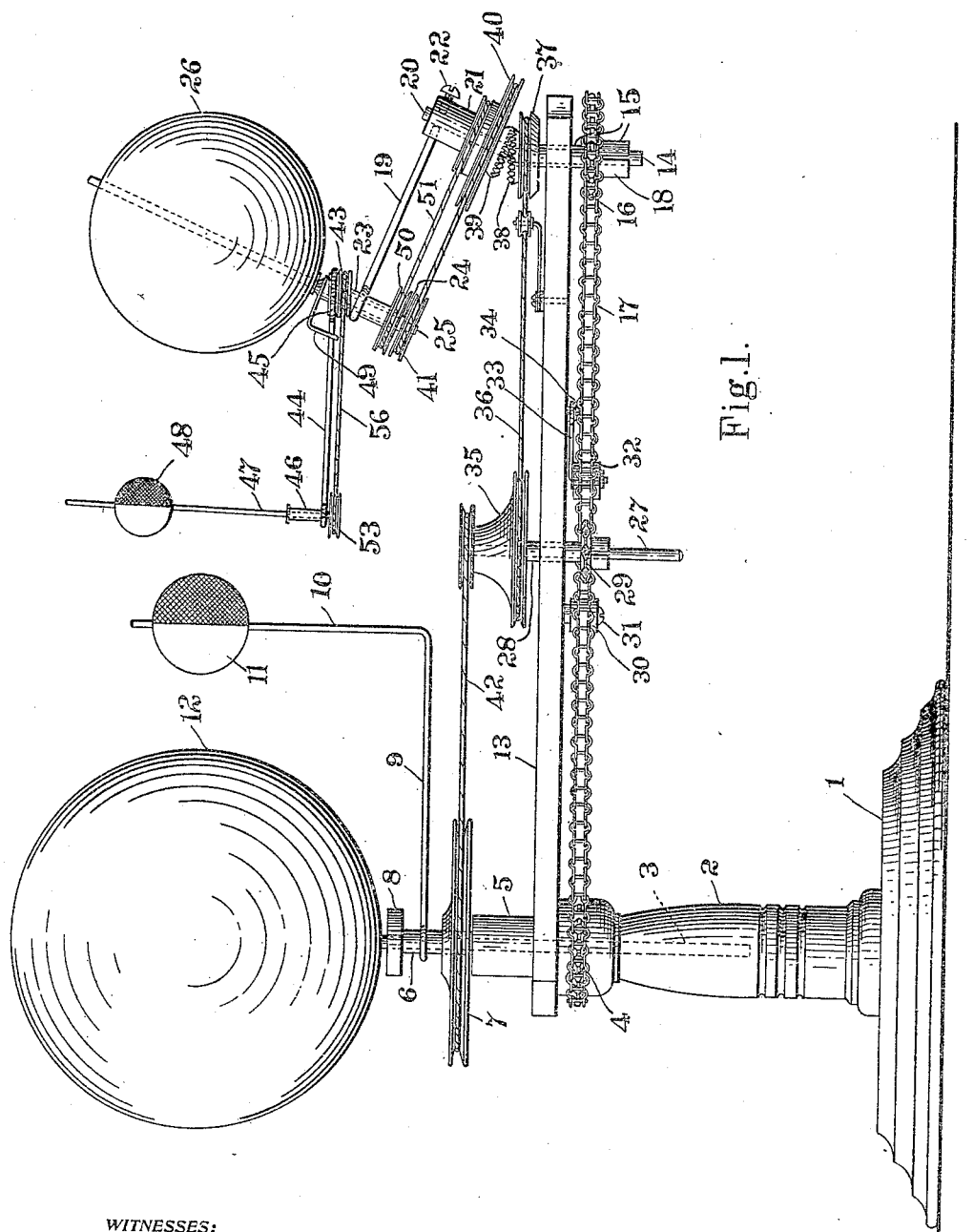

A. LAING.
PLANETARIUM.
APPLICATION FILED JULY 15, 1908.

958,139.

Patented May 17, 1910.
2 SHEETS—SHEET 1.

WITNESSES:
Walter A. Greenburg
Anna M. Dorr

INVENTOR
Alexander Laing
BY
ATTORNEYS

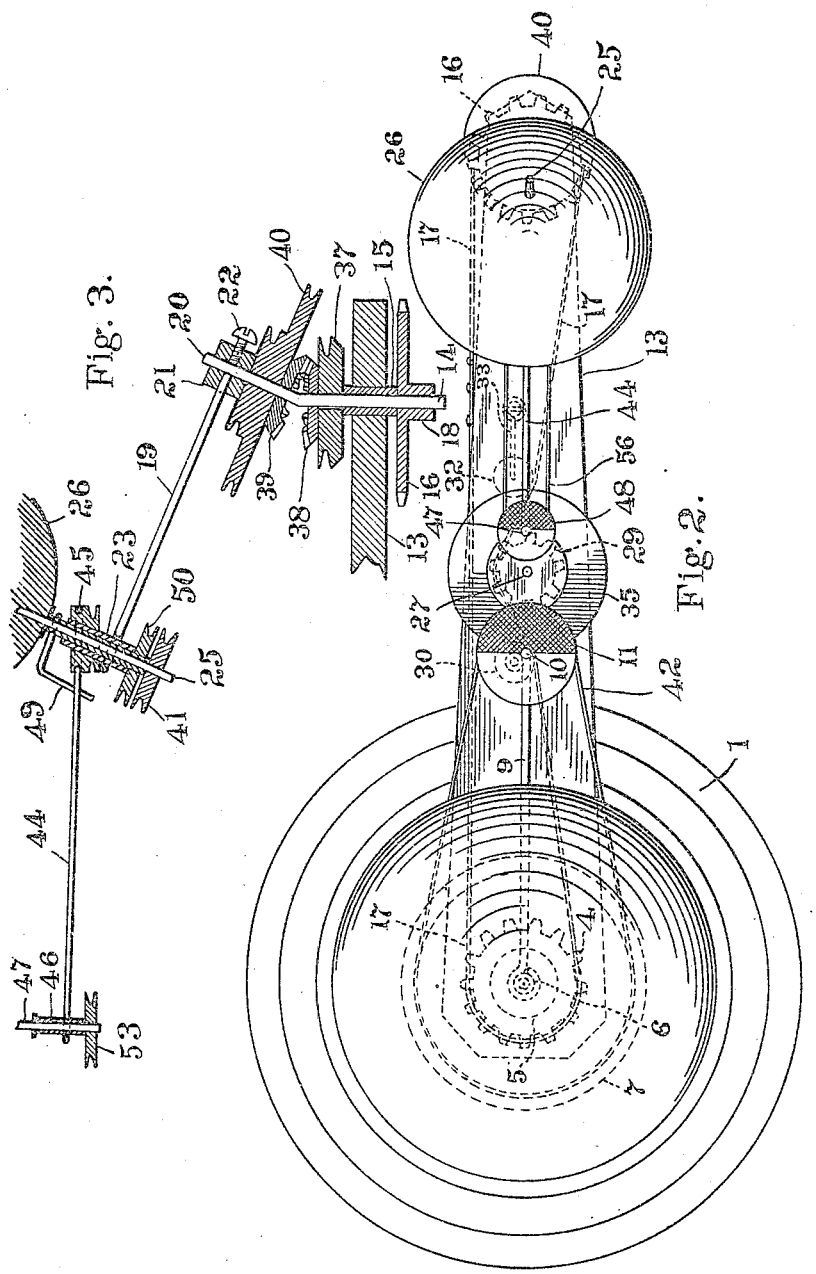

UNITED STATES PATENT OFFICE.

ALEXANDER LAING, OF DETROIT, MICHIGAN.

PLANETARIUM.

958,139.   Specification of Letters Patent.   Patented May 17, 1910.

Application filed July 15, 1908. Serial No. 443,600.

*To all whom it may concern:*

Be it known that I, ALEXANDER LAING, a citizen of the United States of America, residing at Detroit, in the county of Wayne and State of Michigan, have invented certain new and useful Improvements in Planetariums, of which the following is a specification, reference being had therein to the accompanying drawings.

This invention relates to an orrery or planetarium, and more especially to certain arrangements therein for reproducing accurately the different movements of the planets of the solar system in true relation and illustrating the different resultant phenomena whereby a portable apparatus is obtained especially suited for demonstration purposes in lecture or class rooms.

The invention consists in the matters hereinafter set forth, and more particularly pointed out in the appended claims.

In the drawings, Figure 1 is a view in side elevation of an orrery embodying features of the invention. Fig. 2 is a plan view of the orrery. Fig. 3 is a view in detail of a portion of the mechanism.

Referring to the drawings, an appropriately shaped base 1 has a central upright standard 2 in the upper end of which a vertical rod or spindle 3 is non-rotatably secured. A sprocket wheel 4 is keyed or otherwise fixed on the spindle against the upper end of the standard, and a collar 5 or the like is secured or formed on the spindle above the sprocket. A sleeve 6 which forms the hub of a pulley 7, is journaled on the spindle, the collar 5 forming a thrust bearing for the lower end of the sleeve and a disk 8 frictionally engaging the spindle preventing upward displacement. A bracket rod 9 bent at right angles, is secured at its inner end to the pulley sleeve with its outer upturned end 10 parallel to the spindle 3, and carries a ball 11 representing the planet Venus. A sphere 12 on the spindle indicates the sun.

One end of a horizontal arm 13 is apertured and journaled on the spindle below the collar 5. A shaft 14 is mounted in a bushing 15 parallel to the spindle 3 in the outer end of the arm, and a sprocket wheel 16 on the shaft in horizontal alinement with the fixed spindle sprocket 4 is connected thereto by an endless sprocket chain 17. Preferably the outer sprocket 16 has a split or transversely slotted hub 18 frictionally engaging the shaft 14, although a key, set screw or other clamping means may be used. The shaft 14 is bent above the arm 13 at the angle of inclination of the earth's axis to the plane of the ecliptic, and a radius arm 19 at right angles to the oblique portion 20 has an apertured boss 21 embracing the shaft, secured as by a set screw 22, and an elongated bushing 23 at its outer end parallel to the shaft has a tubular shaft 24 journaled therein, with an inner, solid shaft 25 journaled in the tube. A globe 26 on the latter shaft represents the earth, which as the arm 13 is swung on the standard, is thereby caused to describe a substantially correct elliptical orbit eccentrically around the sphere 12 or sun, the sprocket wheels being of equal size so that the radius arm revolves synchronously with the arm 13.

To obtain proper rotation of the earth on its axis, a countershaft 27 parallel to the spindle 3 is journaled in a suitable bushing 28 conveniently secured at the middle of the arm 13. A sprocket wheel 29 fixed on the shaft is engaged by the main drive chain 17, a guide pulley 30 journaled in a stud 31 on the arm, and a swinging tightening drum 32 rotatable on the outer end of a rock arm 33 adjustably secured as by a screw 34 to the arm 13, insuring proper connection between the said wheel and chain. A two-step pulley 35 suitably secured to the countershaft 27 above the arm 13 has one step connected by an endless belt or cord 36 to a pulley 37 rotatable on the shaft 14. A spur, crown or bevel gear 38, either formed or secured on the face of the pulley 37 meshes with a corresponding pinion 39 rotatable on the oblique portion 20, which carries a two-step or cone pulley 40, one of whose steps operates a follower pulley 41 fixed on the shaft 25, the driving train thus formed being properly proportioned to turn the earth in proper relation to the movement of the arm 13. The other step of the countershaft drive pulley 35 is utilized to rotate the pulley 7 through a belt 42 or cord and thereby move the bracket arm 9 and ball 11 at proper velocity around the sun 12 in relation to the revolution of the arm 13 and earth 26 to illustrate the movement of the planet Venus.

As the plane of the moon's orbit around the earth is oblique to the earth's axis as well as to the plane of the earth's orbit, a bearing flange or disk 43 is obliquely apertured and secured on the tubular shaft 24 at the proper angle. A radial arm 44 whose inner end is either apertured or bent into an eyelet 45 rotatable in a peripheral groove near the upper side of the disk has a vertical bushing 46 secured to its outer end, in which a shaft 47 is journaled, and a ball 48 painted or otherwise arranged to show a bright side or hemisphere and a dark side, is slidably mounted on the shaft, the dimensions of the orrery preventing the proper relative position of the moon on eclipse, and the vertical adjustment thereof on the shaft allowing the operator to illustrate this and other phenomena by vertical adjustment of the globe on the shaft. The arm 44 is turned by a fork 49 extending from the tubular shaft 24 which embraces the arm. The shaft 25 is rotated by a pulley 50 thereon connected by a belt or cord 51 passing around the upper step of the pinion pulley 40, the parts being of course properly proportioned to obtain the desired speed of revolution.

While the moon always keeps the same side to the earth, it is desirable for demonstration and class room work that the bright or white side be kept facing the sun and this is accomplished by a belt 56 passing around the grooved or properly faced periphery of the disk 43 below the arm 44 and engaging a suitable pulley 53 secured on the shaft 47.

In operation, the revolution of the main arm on the main spindle actuates the other parts in proper relation to each other through the sprocket chains and transmission trains therefrom, the different paths or orbits described approximating the true movements of the planets and earth closely and illustrating the more important phenomena resulting therefrom. The mechanism is simple and the apparatus very light, attractive in appearance and not readily thrown out of order, this being of great advantage for demonstration purposes in lecture and class-room work.

Obviously, changes in the details of construction may be made without departing from the spirit of the invention and I do not limit myself to any particular form or arrangement of parts.

What I claim as my invention is:—

1. A planetarium comprising a central base and standard, a non-rotatable upright spindle extending from the upper end of the standard, a sphere on the upper end of the spindle, a horizontal arm rotatably secured at one end on the spindle, a shaft having its lower portion journaled in the outer end of the arm parallel to the spindle having an upper portion bent at an angle to the spindle, a radial arm extending from the upper oblique end of said shaft, a bushing at the outer end of the radial arm parallel to the oblique shaft end, a tubular shaft journaled in the said bushing, an inner shaft journaled in the tube carrying a globe on its upper end, a disk obliquely secured on the tubular shaft, a radius arm whose inner end is rotatably secured on the disk periphery, a fork secured to the tubular shaft engaging the radius arm, a bushing on the outer end of the radius arm oblique to the spindle, a shaft rotatable therein, a ball secured on the rod, a pulley journaled on the spindle, having a radial bracket with upturned end parallel to the spindle, a ball on the upturned end, and mechanism coupling the rotatable and revoluble members adapted to operate them in proper timed relation when the horizontal arm is swung on the spindle.

2. A planetarium comprising a central base and standard, a non-rotatable upright spindle extending from the upper end of the standard, a sphere on the upper end of the spindle, a horizontal arm rotatably secured at one end on the spindle, a shaft having its lower portion journaled in the outer ends of the arm parallel to the spindle having an upper portion bent at an angle to the spindle, a radial arm extending from the upper oblique end of said shaft, a bushing at the outer end of the radial arm parallel to the oblique shaft end, a tubular shaft journaled in the said bushing, an inner shaft journaled in the tube carrying a globe on its upper end, a disk obliquely secured on the tubular shaft, a radius arm whose inner end is rotatably secured in the disk periphery, a fork secured to the tubular shaft engaging the radius arm, a bushing on the outer end of the radius arm oblique to the spindle, a shaft rotatable therein, a ball adjustably secured on the rod, a pulley journaled on the spindle having a radial bracket with upturned end parallel to the spindle, a ball on the upturned end, a countershaft journaled on the horizontal arm parallel to the spindle, a sprocket wheel non-rotatably secured on the spindle, an alined sprocket secured on the countershaft, an alined sprocket secured on the outer arm shaft, a sprocket chain operatively connecting said sprockets, a two-step driving pulley fast on the countershaft, a belt connecting one step and the spindle pulley, a bevel gear journaled on the upright portion of the outer arm shaft, a pulley on the gear belted to the other step of the driving pulley, a bevel pinion on the oblique portion of the outer arm shaft meshing with the said gear, a two-step pulley on the gear, a pulley secured on the tubular shaft belted to one step of the pinion pulley, a pulley secured on the inner shaft belted to the other step of the pinion pulley, and a pulley on the radius arm shaft belted to the tubular shaft disk.

3. In a planetarium, a fixed, upright spindle, a sphere representing the sun secured thereon, an arm journaled at its inner end on the spindle to rotate parallel to the plane of the ecliptic, a one piece shaft bent between its ends at the angle of inclination of the earth's axis to the plane of the ecliptic one of whose arms is journaled in the outer end of the arm, a radius arm secured to the upper oblique portion of the shaft perpendicularly thereto, a tubular shaft journaled in the outer end of the radius arm parallel to the bent portion of the arm shaft, an inner shaft rotatable in the tube, a disk secured obliquely on the tubular sleeve in a plane parallel to the plane of the moon's orbit in relation to the plane of the ecliptic, a radius rod whose inner end rotatably engages the disk adapted to revolve parallel to the plane of the moon's orbit, a shaft journaled in the outer end of the rod perpendicular to the plane of revolution, a fork on the tubular shaft engaging the radius rod adapted to interlock them to rotate together in their divergent planes, a globe on the inner shaft representing the earth, a ball on the radius shaft representing the moon, and means for moving said parts in proper relation.

In testimony whereof I affix my signature in presence of two witnesses.

ALEXANDER LAING.

Witnesses:
C. R. STICKNEY,
ANNA M. DORR.